United States Patent [19]
Morton et al.

[11] 3,976,046
[45] Aug. 24, 1976

[54] ATTACHE GRILL

[76] Inventors: Paul S. Morton, 82 Mandalay Drive, Kalamazoo, Mich. 49009; John H. Rossio, 421 W. Melody Ave., Portage, Mich. 49081

[22] Filed: June 30, 1975

[21] Appl. No.: 591,306

[52] U.S. Cl. .............................. 126/9 R; 126/25 A; 126/25 C
[51] Int. Cl.² ..................... A47J 37/00; F24B 3/00; F24C 1/16
[58] Field of Search .............. 126/25 A, 25 R, 25 C, 126/9 R, 9 B

[56] References Cited
UNITED STATES PATENTS

| | | | |
|---|---|---|---|
| 2,497,994 | 2/1950 | Jones | 126/9 R |
| 2,556,365 | 6/1951 | McKnight, Jr. | 126/25 A X |
| 2,559,243 | 7/1951 | Brown | 126/9 R |
| 2,866,883 | 12/1958 | Borden | 126/25 C |
| 3,195,442 | 7/1965 | Russell | 126/9 R X |
| 3,380,444 | 4/1968 | Stalker | 126/9 R X |
| 3,395,691 | 8/1968 | Starsten | 126/25 R |
| 3,611,911 | 10/1971 | Martin | 126/25 R |
| 3,667,446 | 6/1972 | Morton | 126/25 C X |

*Primary Examiner*—Kenneth W. Sprague
*Assistant Examiner*—Harold Joyce
*Attorney, Agent, or Firm*—Woodhams, Blanchard and Flynn

[57] ABSTRACT

A portable charcoal burning grill comprising a first open top receptacle and a first cover therefor pivotally secured thereto and movable between open and closed positions and a second open top receptacle and second cover therefor pivotally secured thereto and pivotal between open and closed positions relative thereto, the second open top receptacle and the second cover therefor being mounted inside the first open top receptacle. A holding device is provided for holding the second cover in the open position when the first cover is also in the open position. A food holding grill is removably engaged with the second cover when the second cover is in the open position and extends over the second open top receptacle. A charcoal holding grid is provided in the second open top receptacle and adjusting means are provided for permitting an adjustment of the vertical spacing between the food holding grill and the charcoal holding grid. The second cover, when in the closed position, serves to extinguish the coals in the second open top receptacle.

12 Claims, 8 Drawing Figures

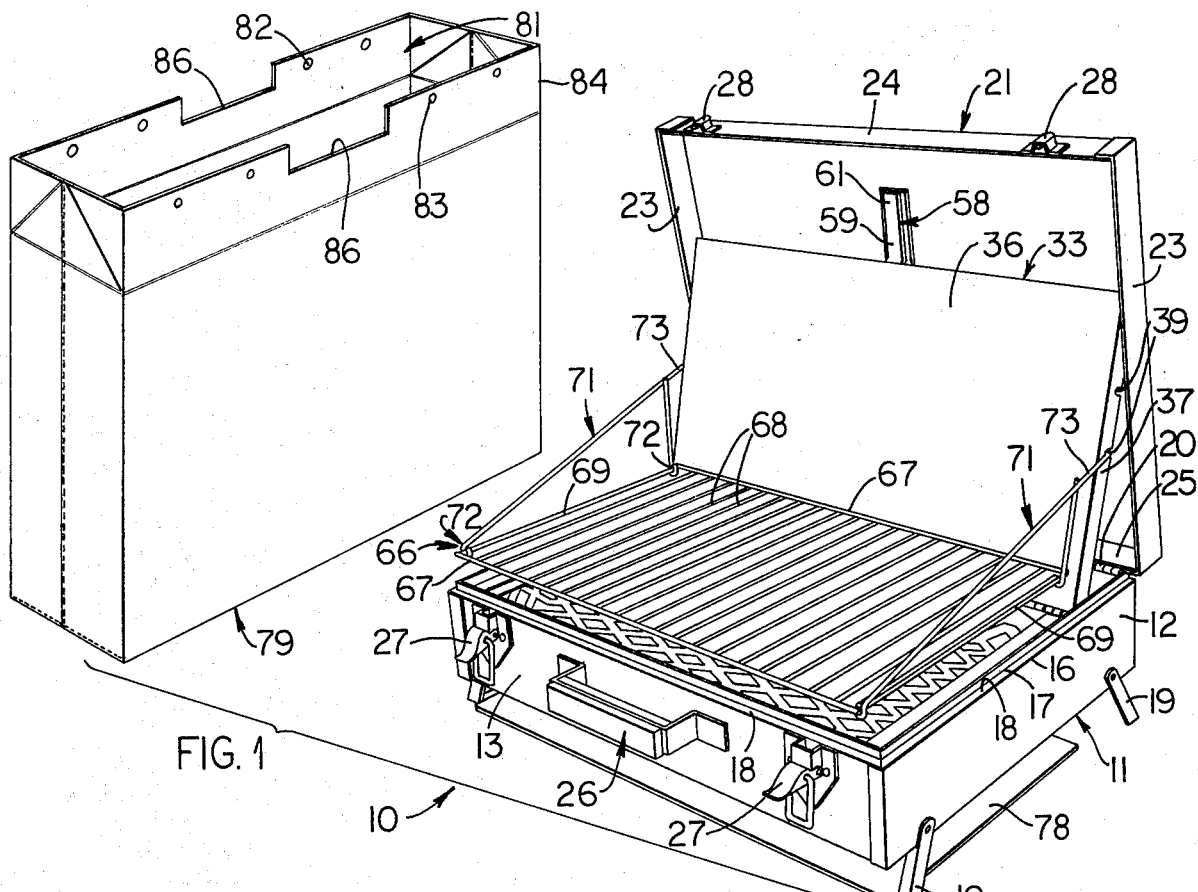
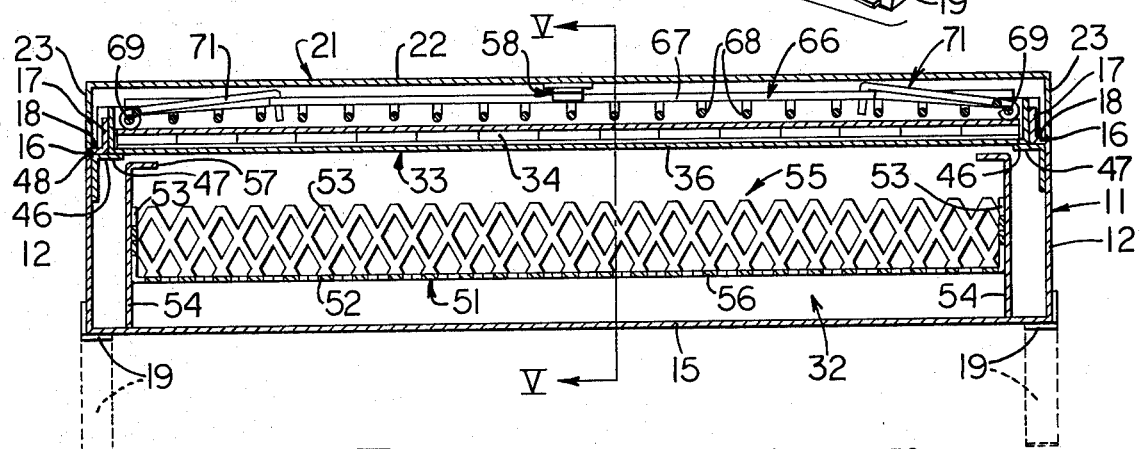
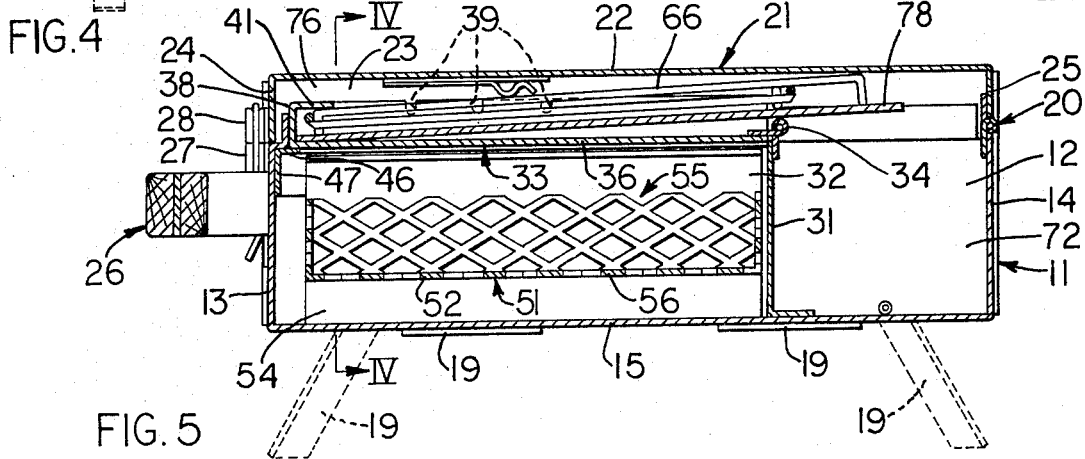

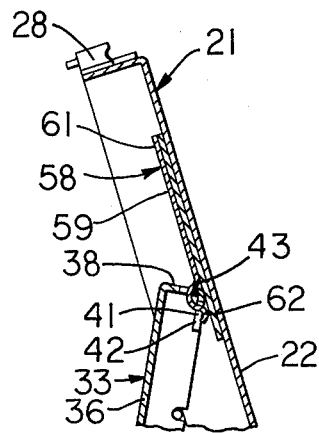
FIG. 8
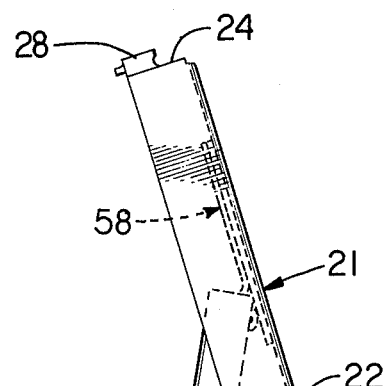
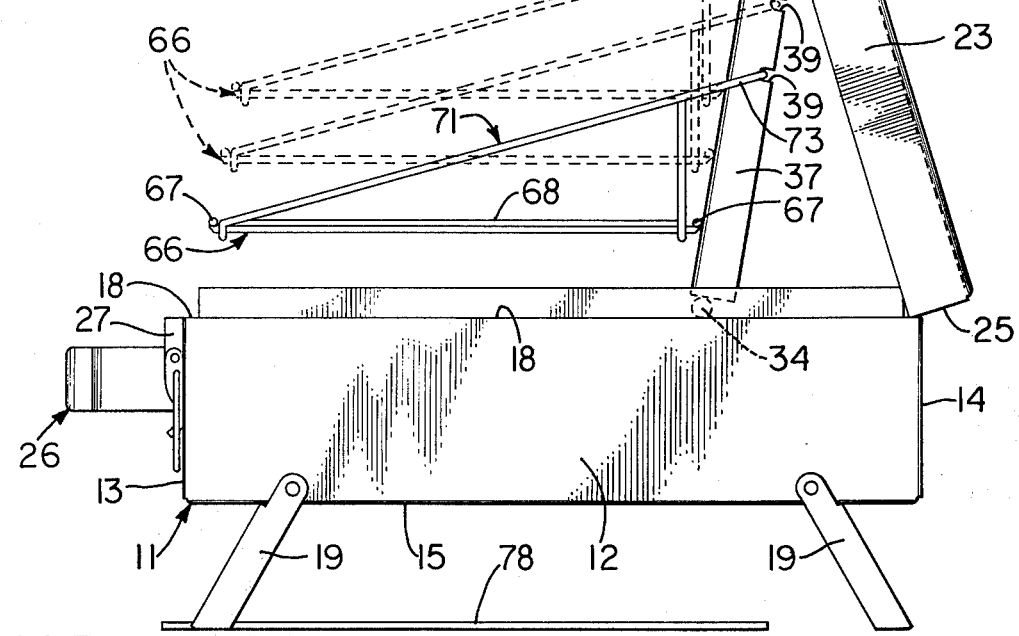
FIG. 3
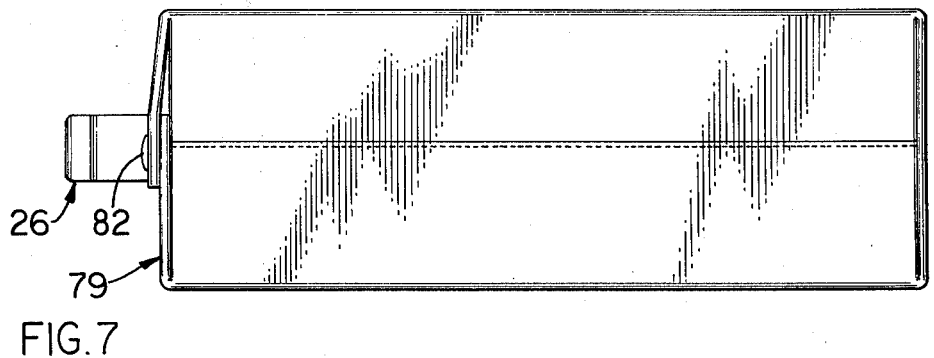
FIG. 7

ATTACHE GRILL

FIELD OF THE INVENTION

This invention relates to a charcoal burning grill and, more particularly, relates to a portable charcoal burning grill having a charcoal burning receptacle mounted within a carrying receptacle, both receptacles having covers therefor with the cover for the charcoal burning receptacle being adapted to extinguish the heat source when in the closed position.

BACKGROUND OF THE INVENTION

Portable charcoal burning grills have been known for many years and have proven to be quite successful for use in outdoor cooking around the home and on camping sites. Portable grills which are also collapsible for transit purposes are also known. However, a need has long existed in a portable-type charcoal burning grill for minimizing the number of components which must be assembled before a cooking operation can be started and for providing storage space within the closed and portable assembly for holding cooking instruments as well as the food holding grill components.

It has long been desirable to be able to pack the cooking apparatus neatly and compactly away. However, with presently known grill constructions, it is not possible to easily dismantle the outdoor cooking apparatus, place same within the carrying receptacle and still have room for the cooking utensils. If cooking utensils are stored within a portable-type charcoal burning grill, such as the apparatus illustrated in Skarsten U.S. Pat. No. 3,395,691, the cooking utensils would necessarily come into contact with the cooking surface defined by the grill. As a result, the handles of the cooking utensils would become covered with grease and the like thereby requiring cleaning before the further handling thereof.

Further, and particularly under camping conditions, it is desirable to be able to dismantle the outdoor cooking apparatus and store same without being concerned about the cooking apparatus being tipped over during transit and spilling residual ashes over the other camping equipment. While it is recognized that a normally careful user would dump the ashes from the outdoor cooking apparatus prior to its being packed for transit purposes, if the device is complicated to assemble and disassemble, the camper may choose not to dismantle it after every use and, as a result, the ashes which have become caked to the firepan would become dislodged and spilled onto other camping equipment.

Further, known portable charcoal burning grills do not have a pleasing appearance when in the collapsed condition and ready for transport from one position to another and are particularly awkward to handle.

Accordingly, the objects of the present invention include:

1. To provide a portable charcoal burning grill which includes means for extinguishment of the heat source;
2. To provide a portable charcoal burning grill, as aforesaid, wherein the components of the grill are all adapted to be received within a base receptacle member and covered by a cover capable of being fixedly secured to the base receptacle member to permit the charcoal burning grill to be conveniently transported from one location to another;
3. To provide a portable charcoal burning grill which, in a position of use, comprises a charcoal holding grate for holding charcoal during a cooking operation and, when the cooking operation is completed, the food holding grill is removed from the supporting structure to permit a cover to be placed over the open top of the charcoal holding receptacle to suffocate the burning charcoal for extinguishing same;
4. To provide a portable and collapsible charcoal burning grill which is inexpensive to manufacture and simple to assemble and disassemble and has the pleasing appearance of an attache case when in carrying condition.

SUMMARY OF THE INVENTION

In general, the objects and purposes of the invention are met by providing a portable charcoal burning grill which comprises means defining a first open top receptacle and a first cover therefor pivotally secured thereto and movable between open and closed positions relative thereto and means defining a second open top receptacle and a second cover therefor pivotally secured thereto and movable between open and closed positions relative thereto. The second open top receptacle means and the second cover are mounted in the first open top receptacle means. Fastener means are provided for fastening the first cover to the first open top receptacle in a closed position to thereby provide a carrying structure. Holding means are provided for holding the second cover in the open position of use and a food holding grill means is removably engaged with the second cover when the second cover is in the open position and said grill extends over the second open top receptacle. A charcoal holding grid is provided in the second open top receptacle and adjusting means are provided for permitting an adjustment of the vertical spacing between the food holding grill means and the charcoal holding grid means.

BRIEF DESCRIPTION OF THE DRAWINGS

In the drawings:

FIG. 1 is a perspective view of my portable charcoal burning grill in the position of use and located next to an envelope into which the portable grill structure is placed when the unit is closed;

FIG. 3 is a side elevational view thereof;

FIG. 4 is a sectional view taken along the line IV—IV of FIG. 5;

FIG. 5 is a sectional view taken along the line V—V of FIG. 4;

FIG. 7 is a side elevational view of the envelope surrounding the grill structure; and FIG. 8 is a sectional view taken along the line VIII—VIII of FIG. 2.

Figure 2:
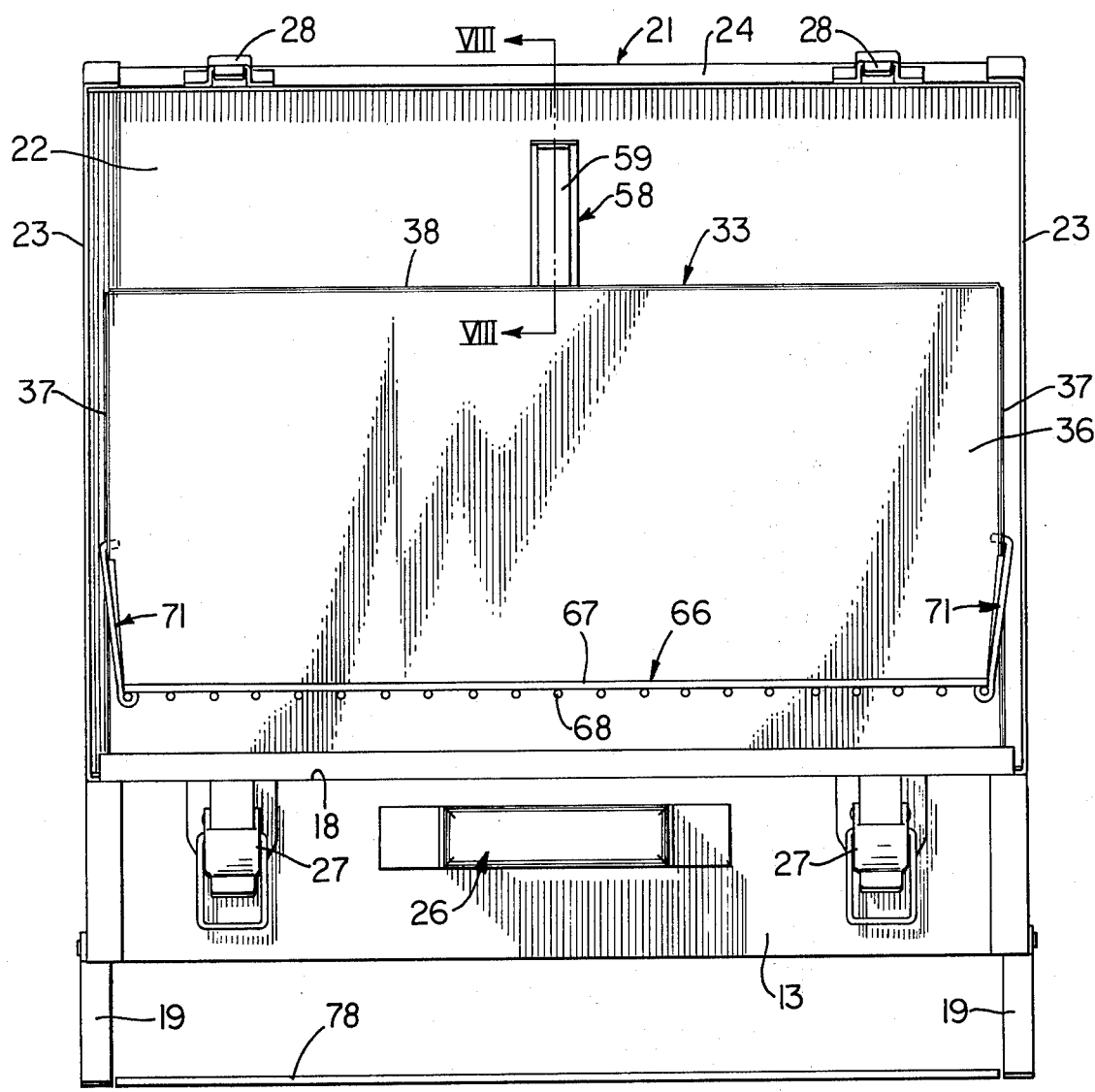
FIG. 2 is a front elevational view of my portable charcoal burning grill.

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the device and designated parts thereof. Such terminology will include the words above specifically mentioned, derivatives thereof and words of similar import.

DETAILED DESCRIPTION

A portable and collapsible charcoal burning grill 10 comprises an open top receptacle 11 having a plurality of upstanding walls, here two laterally spaced walls 12, a front wall 13 and a rear wall 14, and a bottom wall 15. The upper edge of the two laterally spaced walls 12 and the front wall 13 are bent inwardly as at 16 and upwardly again as at 17 to define a generally horizontal surface 18. A pair of retractable legs 19 are each pivotally secured to a lateral wall 12 and movable between a position illustrated in FIG. 3, for example, and a position illustrated in solid lines in FIGS. 4 and 5. Each of the legs 19 is generally L-shaped in cross section and embrace, in the retracted position illustrated in FIG. 4, for example, the lateral walls 12 and the bottom wall 15 of the receptacle 11.

A cover 21 comprises a top surface 22, a pair of laterally spaced walls 23, a front wall 24 and a rear wall 25. The laterally spaced walls 23, the front wall 24 and the rear wall 25 each extend downwardly from the top surface 22 at the periphery thereof. The lower extremity of the laterally spaced walls 23 and the front wall 24 engage the generally horizontal surface 18 on the receptacle 11. A hinge 20, such as a piano hinge, pivotally secures the upper edge of the rear wall 14 of the receptacle 11 to the lower edge of the rear wall 25 on the cover 21.

A handle 26 is secured to the front wall 13 of the receptacle 11 at a generally central location thereon. Two laterally spaced pairs of conventional and cooperating fastening devices 27 and 28 are secured to the front wall 13 of the receptacle 11 and the front wall 24 of the cover 21, respectively, to permit a securement of the cover 21 in the closed position over the open top of the receptacle 11.

An upstanding wall 31 is spaced forwardly from the rear wall 14 of the receptacle 11, is secured to the bottom wall 15 and is secured to and extends between the two laterally spaced walls 12. The upper edge of the upstanding wall 31 terminates at a height about equal to the height of the hinge 20 from the bottom wall 15 of the receptacle 11. Thus, the two laterally spaced walls 12, the front wall 13 and the upstanding wall 31 define a second receptacle 32 inside the first receptacle 11. A cover 33 is hingedly secured by a hinge, such as a separable hinge 34, to the upper edge of the upstanding wall 31. The cover 33 comprises a top wall 36 which overlies the opening into the receptacle 32, a pair of laterally spaced upstanding walls 37 and an upstanding front wall 38, both of which project upwardly from the top wall 36. The upper edge of each of the laterally spaced walls 37 has a plurality of notches 39 therein. The upper edge of the front wall 38 has a rearwardly extending flange 41 thereon to define a grip under which the user's fingers may be placed to assist in the raising of the cover 33 from the closed position illustrated in FIGS. 4 and 5 to the raised position illustrated in FIGS. 1, 2 and 3.

A notch 42 (FIG. 8) is provided in the flange 41 in the central area thereof. In addition, a small hole 43 is provided through the front wall 38 adjacent the notch 42. The purpose of this structure will be explained in detail hereinbelow.

The cover 33, when in the closed position, engages, along the two laterally spaced walls 12 and the front wall 13, a horizontal lip 46 (FIGS. 4 and 5) defined by an L-shaped angle piece 47, the corner 48 of which is received in the inside corner defined by the inward bend 16 on the laterally spaced walls 12 and the front wall 13. The lateral edge of the wall 36 of the cover 33 engages the lip 46 along the three sides thereof.

A charcoal holding grid 51 is received in the second receptacle 32. The charcoal holding grid 51 is comprised of a sheet of perforated heat-resistant metal 52 which is bent along the peripheral edges to form a container 55 having four upstanding sidewalls 53. A pair of laterally spaced upstanding walls 53 of the container 55 are secured to a pair of laterally spaced upright support members 54 which engage the bottom wall 15 of the second receptacle 32 and effect a spacing of the bottom wall 56 of the container 55 from the bottom wall 15 of the second receptacle 32. An inwardly extending flange 57 is provided at the upper edge of each of the support members 54 to facilitate a removal of the charcoal holding grid 51 from the second receptacle 32.

A bracket 58 is secured to the inside surface of the wall 22 of the cover 21. A resilient clip 59 is secured to the bracket at one end 61 and is resiliently flexible away from the bracket 58 at the opposite end 62 (FIG. 8). When the cover 21 is in the open position as illustrated in FIGS. 1, 2, 3 and 8, the end 62 of the resilient clip 59 is received through the hole 43 in the front wall 38 and in the notch 42 in the flange 41 on the cover 33 to secure the cover 33 and the cover 21 in the opened position. As a result, the notches 39 in the laterally spaced walls 37 on the cover 33 are vertically spaced from one another as best illustrated in FIG. 3.

A food holding grill 66 is made up of at least two longitudinal wire members 67 and a plurality of wire cross members 68 weldably secured to the longitudinal wire members 67. The lateralmost wire cross members 69 each have a wire bracket member 71 pivotally secured thereto. Each wire bracket member 71 is comprised of a plurality of hinge segments 72 and a hook-shaped member 73 receivable in a notch 39 in the cover 33. The rearwardmost longitudinal wire member 67 engages the inner surface of the wall 36 of the cover 33 at a location which is spaced below the location at which each of the hook members 73 are received in a pair of horizontally aligned notches 39. Since the wire bracket members 71 engage, at the hinge segments 72, the food holding grill 66 at two spaced points, namely a point adjacent the forwardmost edge of the food holding grill and a point adjacent the rear edge thereof, the food holding grill 66 is thereby supported in a cantilevered manner on the cover 33 above the charcoal holding grid 51. The food holding grill 66 can be easily removed from the cover 33 and the wire bracket members 71 pivoted so as to become parallel to the plane of the food holding grill 66.

A vertical spacing 76 exists between the wall 36 of the cover 33 and the wall 22 of the cover 21 when both covers 21 and 33 are in the closed position. The vertical spacing 76 defines a first storage chamber. Similarly, the horizontal spacing between the rear wall 14 of the first receptacle 11 and the upstanding wall 31 defines a second storage space 77, the depth of which corresponds to the depth of the first receptacle 11.

A sheet of asbestos 78 or the like may be positioned, if desired, beneath the bottom surface 15 of the grill 10. The sheet of asbestos 78 has a dimension which is smaller than the dimension of the first receptacle 11 to facilitate a placement thereof inside the first receptacle in the first storage space 76 along with the collapsed food holding grill 66 (FIG. 5). The sheet of asbestos 78 serves to protect the supporting surface for the grill 10 from the radiated heat from the bottom wall 15 of the second receptacle 32.

Figure 6:
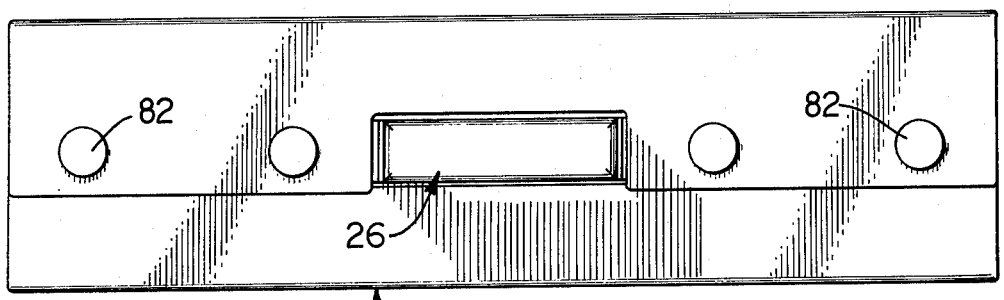
FIG. 6 is a top elevational view of my portable charcoal burning grill with the envelope surrounding the grill structure.

In order to enhance the appearance of the portable grill as a total product, an envelope 79 is provided which has an opening 81 therein. A plurality of cooperating snap fasteners 82 and 83 are provided adjacent the upper edge surrounding the opening 81. The size of the envelope 79 is generally slightly larger than the outer dimension of the first receptacle 11 and cover 21 when the cover 21 is in the closed position and the cooperating fastener elements 27 and 28 are united to hold the cover 21 in the closed position. A portion 84 of the envelope 79 adjacent the upper edge having the cooperating snap fasteners 82 and 83 thereon is foldable so that the cooperating snap fasteners 82 and 83 become overlapped to facilitate a fastening together thereof to encase the charcoal burning grill therein. A pair of cut-outs 86 are provided in the upper edge of a pair of sidewalls of the envelope so that the handle 26 will be exposed when the envelope fully encases the charcoal burning grill 10. The fully encased charcoal burning grill 10 is best illustrated in FIGS. 6 and 7 and has an appearance of an attache case.

OPERATION

Although the use of the charcoal burning grill embodying the invention will be apparent to persons acquainted with this general type of apparatus, the use of the charcoal burning grill will be described in detail hereinbelow for convenience.

The charcoal burning grill can be set up in a position of use by first unlocking the cooperating snap fasteners 82 and 83 and pulling the charcoal burning grill 10 from the envelope 79. Next, the legs 19 can be pivoted from the solid line positions illustrated in FIGS. 4 and 5 to the broken line position. Next, the cooperating fastener elements 27 and 28 can be unfastened and the cover 21 pivoted about the hinge 20 to move the cover 21 to the fully opened position thereby exposing the contents in the first receptacle 11. The collapsed food holding grill 66 and the asbestos sheet 78 may now be removed from the first storage space 76 on top of the cover 33 for the second receptacle 32. The asbestos sheet 78, if used, is placed in a position beneath the bottom wall 15 of the receptacles 11 and 32 as illustrated in FIGS. 1, 2 and 3. The cover 33 is next pivoted about the hinge 34 to move the cover 33 to the fully opened position. The covers 21 and 33 are orientable to a position wherein the end 62 of the resilient clip 59 will be received in the hole 43 in the front wall 38 and the notch 42 in the flange 41. Thus, the two united covers 21 and 33 will be locked together and incapable of relative movement therebetween. In this position, the laterally spaced walls 37 on the cover 33 will be generally vertically aligned and the notches thereon will become vertically spaced.

The wire bracket members 71 on the food holding grill 66 are now pivoted so that each thereof becomes aligned with the laterally spaced walls 37 on the cover 33. The hooklike members 73 are received in the desired notch 39 and the rearmost longitudinal wire member 67 engages the inner surface of the wall 36 of the cover 33 so that the food holding grill 66 becomes cantilevered over the second receptacle 32. Assuming that charcoal or the like has already been placed in the charcoal holding grid 51, ignited and is now ready for cooking, food products and the like may be placed on the food holding grill 66 and cooked to the desired extent.

At the completion of the cooking operation, the food holding grill 66 may be removed from engagement with the cover 33 and the cover 33 disengaged from the cover 21 so that the cover 33 can be pivoted about the hinge 34 to close the second receptacle 32. Since the peripheral edges of the wall 36 of the cover 33 engage the lip 47, the charcoal is thus suffocated and extinguished. When the entire unit has cooled, the food holding grill 66 in the collapsed position and the asbestos sheet 78 may be placed on top of the cover 33 in the first storage space 76. Additional cooking utensils such as tongs, forks, spatulas and turners or the like can be placed into the second storage space 77. Thereafter, the cover 21 can be pivoted about the hinge 20 to the fully closed position and the cooperating fastening elements 27 and 28 may be fastened together. Thereafter, the charcoal burning grill 10 can be placed back into the envelope 79, the cooperating fastening elements 82 and 83 becoming fastened together so that once again the portable charcoal burning grill has the appearance of an attache case.

The separable hinge 34 is provided to permit a removal of the cover 33 for cleaning purposes. That is, the cover 33 can be removed to facilitate a cleaning of the second receptacle 32 as well as the remainder of the grill unit.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A portable and collapsible charcoal burning grill, comprising:
    means defining a first open top receptacle and a first cover pivotally secured thereto and movable between open and closed positions relative thereto;
    fastener means for fastening said first cover of said first open top receptacle in a closed position to define a carrying structure;
    means defining a second open top receptacle and a second cover pivotally secured thereto and movable between open and closed positions relative thereto, said second open top receptacle means and said second cover being mounted in said first open top receptacle means;
    holding means for holding said second cover in said open position and in a position of use;
    food holding grill means removably engaging said second cover when said second cover is in said open position, said grill means extending over said second open top receptacle; and
    charcoal holding grid means in said second open top receptacle.

2. The device of claim 1 including also adjusting means for permitting an adjustment of the vertical spacing between said food holding grill means and said charcoal holding grid means.

3. A portable and collapsible charcoal burning grill according to claim 1, wherein said second receptacle means is smaller in dimension than said first receptacle means to define a first storage space in said first receptacle means.

4. A portable and collapsible charcoal burning grill according to claim 2, wherein said first receptacle means has a bottom wall and four upstanding sidewalls;
wherein said second receptacle means has a bottom wall and four upstanding sidewalls; and
wherein said one of said sidewalls of said second receptacle is horizontally spaced from and parallel to one of said sidewalls of said first receptacle means and perpendicular to a pair of laterally spaced sidewalls on said first receptacle means to define said first storage space.

5. A portable and collapsible charcoal burning grill according to claim 3, wherein said second cover and said first cover are generally parallel to and vertically spaced from each other in the closed position to define a second storage space.

6. A portable and collapsible charcoal burning grill according to claim 5, wherein said food holding grill means includes collapsible engagement means, said collapsible engagement means when in a position of use engaging said second cover and when in a collapsed position and out of engagement with said second cover facilitating a placing of said food holding grill means in said second storage space.

7. A portable and collapsible charcoal burning grill according to claim 1, wherein said holding means comprises a bracket mounted on an inside surface of said first cover, said second cover engaging said bracket and being held in said opened position.

8. A portable and collapsible charcoal burning grill according to claim 1, wherein said charcoal holding means comprises a container having a perforated surface thereon received in said second receptacle means, a bottom wall of said container being vertically spaced from a bottom wall of said second receptacle means.

9. A portable and collapsible charcoal burning grill according to claim 1, including a flexible cover carrying case having cut-out means thereon; and
including a carrying handle mounted on said first receptacle means; and
wherein said first receptacle means, when said first cover is in the closed position, housing said second receptacle means therein is received in said carrying case and said handle is exposed through said cut-out means.

10. A portable and collapsible charcoal burning grill according to claim 1, including collapsible leg means mounted on said first receptacle means to space a bottom wall of said first receptacle above a supporting surface.

11. A portable and collapsible charcoal burning grill according to claim 10, including heat shield means between said bottom wall of said first receptacle means and said supporting surface, said heat shield means being receivable inside said grill for transportation purposes.

12. A portable and collapsible charcoal burning grill according to claim 1, wherein said second cover is secured to one edge of second receptacle by a separable hinge construction.

* * * * *